Patented Apr. 25, 1944

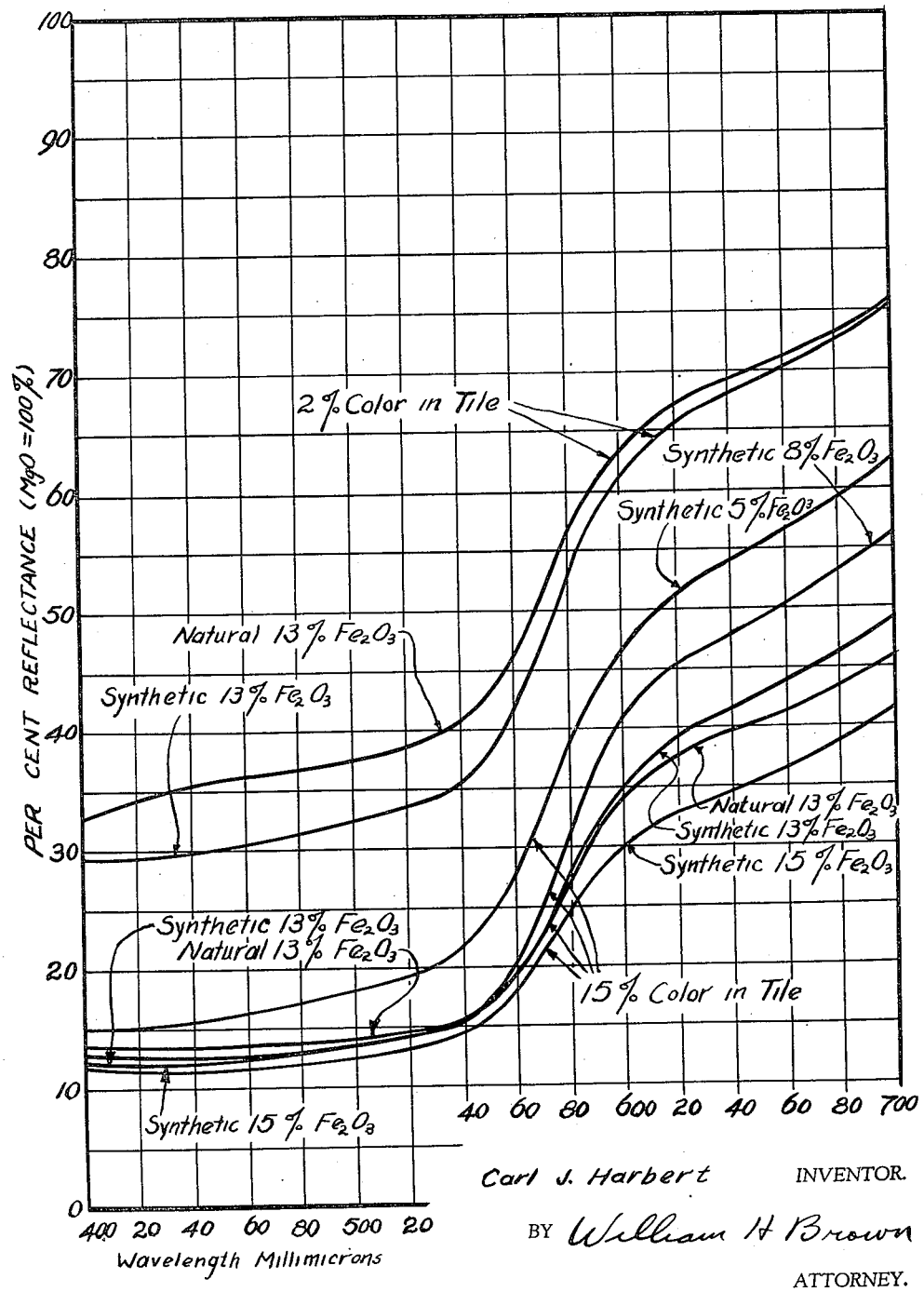

2,347,630

UNITED STATES PATENT OFFICE 2,347,630

CERAMIC PIGMENT

Carl J. Harbert, Shaker Heights, Ohio, assignor to The Harshaw Chemical Company, Elyria, Ohio, a corporation of Ohio Application July 23, 1941, Serial No. 403,715

10 Claims. (Cl. 106—304)

This invention relates to ceramic pigments of the type known as body stains, and specifically to iron oxide-silica stains which are capable of developing in ceramic bodies yellow-pink or salmon-pink to deep brown-red colorations.

The objects of the invention are to provide iron oxide-silica pigments which are of these desirable hues, which are stable, resistant to high firing and which give strong and pleasing colors and, further, to provide a process for producing such pigments.

I am aware that prior to my invention an iron-silica pigment has been commercially used. The pigment referred to is a natural product known as Jap ochre, which, however, was never fully satisfactory because of the variations in composition and color from one shipment to the next. It has, however, remained in use to a considerable extent, and this I attribute to the inability of pigment makers to synthesize a pigment of the same type which would not fire out in ceramic bodies or to their inability to produce a different pigment having the same desirable color and firing characteristics.

It is known that many unsuccessful attempts have been made to synthesize Jap ochre by calcining together the constituent oxides or materials capable of yielding the constituent oxides, various types of clay, etc.

Jap ochre contains approximately from 6% to 13% of $Fe_2O_3$, from 0% to 2% $Al_2O_3$ and the remainder $SiO_2$ and impurities. The state of association of these constituent oxides is uncertain. Calcining a mechanical mixture thereof does not produce a pigment of the properties of Jap ochre even though very finely ground and very thoroughly mixed. Indeed, in my experience, it does not produce a ceramic pigment of any value whatever. The color fires out almost completely in ceramic bodies.

I have now discovered a method of producing iron-silica pigments which are not only equal but actually superior to Jap ochre in color, cleanness and firing characteristics as body or underglaze stains. The color comparison with Jap ochre is illustrated in the accompanying drawing wherein the figure is a diagram upon which has been reproduced approximately exactly the curves produced on a Hardy recording spectrophotometer, and showing color characteristics of Jap ochre of 13% $Fe_2O_3$ content and pigments produced according to the present invention of various $Fe_2O_3$ content.

The present invention is concerned with both the novel process and the superior pigments produced thereby. I have been able to produce valuable pigments of compositions from 5% to 15% $Fe_2O_3$, remainder $SiO_2$. It is, in fact, easy to produce compositions of even lower iron oxide content than 5%, however, it is not usually desirable to do so since the color oxide per pound is thereby reduced, the pigment not being in any way improved. On the other hand, increasing the iron oxide content is difficult but very desirable since the color is thereby strengthened so long as the iron oxide and silica are associated in such a way that firing out does not occur when the pigment is employed as a body or underglaze stain. The upper limit I have found to be in the order of 15% $F_2O_3$. I prefer to produce these pigments containing from 8% to 13% $Fe_2O_3$.

So far as I know, there is only one deposit of Jap ochre (France) and I believe no one knows how this material was formed. It is, in any event, very unlikely that it could have been formed in the manner in which I form my novel pigments. Probably the physical condition of the material, i. e., the state of association of the $Fe_2O_3$ and $SiO_2$ is different in the cases of the natural earth and my synthetic products, but I have not been able to establish with certainty what the state of association is in either case.

I have found that my novel pigments must not be too finely divided. If they are, they will fire out in ceramic bodies. The particles should not be less than 10 microns in smallest dimension. Of course, a proportion of the particles may be smaller without affecting the remainder, but the major portion should be above 10 microns.

Chemically, my novel compositions correspond to the empirical formula $Fe_2O_3 \cdot xSiO_2$, where $x$ may have a value from 15 to 50 or higher. These molecular proportions correspond to about 15% $Fe_2O_3$ down to about 5% $Fe_2O_3$ or less, percentages being based upon combined weight of $Fe_2O_3$ and $SiO_2$. It is my belief that there is formed a crystoballite crystal structure, or that iron oxide or possibly ferric silicate is produced and is surrounded and protected by crystoballite. I regard my novel compositions as calcination products of xerogels derived from associations of ferric oxide, silica and water, the state of association, whether physical, chemical or mere mixture, being at present undetermined.

I have produced compositions of value by soaking into the capillaries of activated silica gel solutions of thermally decomposable iron salts and then calcining. However, this process did not yield pigments of as great value as the preferred process.

My preferred process for producing the novel pigments consists essentially in drying and calcining gels capable upon dehydration of yielding compositions of the empirical formula $Fe_2O_3 \cdot xSiO_2$, where $x$ has a value such that the $Fe_2O_3$ content is approximately from 5% to 15% of the combined weight of $Fe_2O_3$ and $SiO_2$.

In the preferred practice, the process consists in the following steps:

(1) A ferric salt, an acid and an alkali silicate are brought together in aqueous medium whereby to form the desired gel. The proportions of ferric salt and alkali silicate are selected in accordance with the composition desired in the final product, within the above indicated limits. The proportion of acid is then selected so as to finish the reaction at a pH above the hydrolyzation point of the ferric salt. Suitably the proportion is such as to finish the reaction at pH 7.0. The alkali silicate should be added to the salt solution. The amount of water employed suitably is such that the weight of the reaction mixture is about 15 or 16 times that of the combined $Fe_2O_3$ and $SiO_2$ content thereof in the case of 15% $Fe_2O_3$ pigment. For lower iron content pigment, the amount of water may be reduced, e. g., to 10 times the combined weight of $Fe_2O_3$ and $SiO_2$ in the case of an 8% $Fe_2O_3$ pigment. The reaction mixture is allowed to stand until it "sets up" to a gel.

(2) The gel is dried preferably without deformation. Drying may be accomplished at room temperature or at elevated temperatures preferably not exceeding 250° C. On drying the gel is greatly reduced in volume, for example, to the order of one-tenth its original volume.

(3) The xerogel (dried gel) is washed with water to remove soluble salts.

(4) The washed material is calcined preferably in an oxidizing atmosphere at from 800° C. to 1400° C. The temperature may be brought to the indicated range in a period of about three or four hours or longer, if desired, and held within that range from 1 to 3 hours.

(5) The so calcined material may be then ground to a fine state of subdivision, but not below 10 microns for the major portion, and preferably to from 200 to 400 mesh.

The preferred raw materials are ferric sulfate or ferric ammonium sulfate, sulfuric acid and sodium silicate. The use of ferric ammonium sulfate is desirable in the case of pigments of 10% to 15% $Fe_2O_3$ content since by firing in such cases at temperatures of the order of 900° C. to 1050° C., a more yellowish color can be obtained while higher firing (e. g., 1200° C. to 1400° C.) will change the color toward the blue. If ferric sulfate is used instead of ferric ammonium sulfate, the bluish color is produced in either case. The terms yellowish and bluish do not refer to any gross color difference but merely represent two or three percentage points on the color curve at the blue and red ends.

The following specific examples will serve to illustrate the invention:

Example I

A solution was made up containing 70 pounds of $FeSO_4 \cdot 7H_2O$, 84 pounds of 66° Baumé $H_2SO_4$, 3 pounds of 30% $H_2O_2$ (to oxidize the ferrous sulfate to the ferric state) and 1500 pounds of water. A second solution was made up consisting of 800 pounds of 40° Baumé sodium silicate and 1300 pounds of water. The second solution was added slowly with agitation until the reaction mixture exhibited a pH value of about 5.0. The mixture set up into a gel at room temperature in about 30 minutes. The gel was dried at 250° C. until its weight had been reduced to about 10% of the original gel weight and then immersed in water whereupon it crumbled into a coarse granular state. This granular material was washed until the sodium content was reduced to about 0.2%. The washed material was then heated up to 1000° C. in a period of about 4 hours and held at that temperature for 2 hours. The calcine was then ground to an average particle size of about 300 mesh. This pigment was used as a body stain and produced a pleasing, medium dark, salmon pink color. The color (10% $Fe_2O_3$—90% $SiO_2$) was a little lower in the violet and substantially higher in the yellow and red than produced by Jap ochre under the same conditions.

Example II

The procedure of Example I was followed substantially in all respects other than in the batch composition which was, for the first solution: 66 lbs. $FeCl_3 \cdot 6H_2O$, 104 lbs. HCl, 1500 lbs. water, and for the second solution, the same as in Example I. The second solution was added to the first solution to pH 4.5. The color contained 10% $Fe_2O_3$ and 90% $SiO_2$ and was similar to the product of Example I although slightly less pleasing. The chloride is slightly less desirable as a raw material than the sulfate.

Example III

In this case, the first solution was made up of 117 lbs. $FeNH_4(SO_4)_2 \cdot 12H_2O$, 68 lbs. of 66° Baumé sulfuric acid and 2000 lbs. of water. The second solution was as in Example I and was added to a pH of 5.5. The gel set in a little less than an hour. The color was completed as in Example I. The proportion of $Fe_2O_3$ was 10% and the color was in all respects equal to that produced according to Example I.

Example IV

Following otherwise the procedure of Example I, the first solution was made up of 120 lbs. of $FeSO_4 \cdot 7H_2O$, 66.5 lbs. $H_2SO_4$ of 40° Baumé concentration, 45 lbs. $H_2O_2$ (to covert the ferrous sulfate to the ferric state), 16 lbs. $(NH_4)_2SO_4$ and 1000 lbs. $H_2O$. The second solution was as in Example I, added to pH 4.5. The gel formed in less than an hour at room temperature. The color contained 14% $Fe_2O_3$ and 86% $SiO_2$ and was, therefore, of superior coloring value per pound. It exhibited no tendency to fire out in body and was in no respect inferior to the product of Example I.

Example V

Following otherwise Example I, the first solution was made up of 42 lbs. $FeSO_4 \cdot 7H_2O$, 94 lbs. 66° Baumé $H_2SO_4$, 18 lbs. 30% $H_2O_2$, 1000 lbs. water. The second solution was made up of 800 lbs. sodium silicate of 40° Baumé and 2000 lbs. water and was added to pH 6.0. The gel formed in about one hour. The resulting pigment contained only 5% $Fe_2O_3$ but was otherwise equal to the product of Example I.

Example VI

Following otherwise Example I, the first solution was made up of 98.7 lbs. $Fe(NO_3)_3 \cdot 9H_2O$, 76.8 lbs. concentrated nitric acid and 2000 lbs. $H_2O$. The second solution was made up of 800 lbs. of 40° Baumé sodium silicate and 1000 lbs. of water. This yielded an excellent color of 10% Fe₂O₃ content. It is, however, uneconomical to use the relatively expensive nitrate.

In all the foregoing examples, the 40° Baumé sodium silicate was approximately 28% SiO₂ and pH 11.0 to 11.5. It is to be understood that in the preliminary stages, the Fe₂O₃ may exist in hydroxide, hydrate or hydrous oxide form.

Having thus described my invention, what I claim is:

1. A process for forming an iron-silica ceramic pigment including the steps of forming a gel by reacting an inorganic water soluble ferric compound and an acid with a soluble alkaline silicate in proportions capable of yielding a composition of emperical formula Fe₂O₃·$x$SiO₂, where $x$ is of such value that the Fe₂O₃ is not more than 15% of the combined weights of Fe₂O₃ and SiO₂, and water in gel forming quantity, drying, washing and calcining.

2. A process of forming a ceramic pigment including forming a ferric oxide-silica xerogel of silica content not less than approximately five times the requirement for ferric meta silicate (Fe₂O₃·3SiO₂) by reacting a water soluble inorganic ferric salt and an acid with a soluble alkaline silicate whereby to form a gel and drying the resulting gel, the resulting product containing substantially no free water or alkali salts, and calcining the same.

3. A process of forming a ceramic pigment including forming a ferric oxide-silica xerogel of silica content not less than approximately five times the requirement for ferric meta silicate (Fe₂O₃·3SiO₂) by reacting a water soluble inorganic ferric salt and an acid with a soluble alkaline silicate whereby to form a gel and drying the resulting gel, the resulting product containing substantially no free water or alkali salts, and calcining the same at a temperature from 800° C. to 1400° C.

4. A process of forming a ceramic pigment comprising bringing together in aqueous medium a water soluble, inorganic ferric salt, an acid and an alkali silicate in proportions to form a gel and to finish the reaction at a pH value above the hydrolyzation point of the ferric salt, drying, washing and calcining at from 800° C. to 1400° C., the proportions of ferric salt and alkali silicate being such that in the final product the weight of Fe₂O₃ is from 8% to 13% of the combined weight of Fe₂O₃ and SiO₂.

5. A process of forming a ceramic pigment comprising bringing together in aqueous medium a water soluble, inorganic ferric salt, an acid having the same negative radical as said salt, and an alkali silicate in proportions to form a gel and to finish the reaction at a pH value above the hydrolyzation point of the ferric salt, drying, washing and calcining at from 800° C. to 1400° C., the proportions of ferric salt and alkali silicate being such that in the final product the weight of Fe₂O₃ is from 8% to 13% of the combined weight of Fe₂O₃ and SiO₂.

6. A process of forming a ceramic pigment comprising bringing together in aqueous medium a water soluble, inorganic ferric salt, an acid and an alkali silicate in proportions to form a gel and to finish the reaction at a pH value above the hydrolyzation point of the ferric salt, drying, washing and calcining at from 800° C. to 1400° C., the proportions of ferric salt and alkali silicate being such that in the final product, the weight of Fe₂O₃ is from 5% to 15% of the combined weight of Fe₂O₃ and SiO₂.

7. A process of forming a ceramic pigment comprising bringing together in aqueous medium a water soluble, inorganic ferric salt, an acid having the same negative radical as said salt, and an alkli silicate in proportions to form a gel and to finish the reaction at a pH value above the hydrolyzation point of the ferric salt, drying, washing and calcining at from 800° C. to 1400° C., the proportions of ferric salt and alkali silicate being such that in the final product the weight of Fe₂O₃ is from 5% to 15% of the combined weight of Fe₂O₃ and SiO₂.

8. A process of forming a ceramic pigment comprising adding an alkali silicate to an aqueous solution of ferrous sulphate, sulphuric acid and hydrogen peroxide in proportions to form a ferric gel and to finish the reaction at a pH value above the hydrolyzation point of the ferric salt, drying the gel at a temperature of about 250° C., washing in water until substantially free from sodium content, calcining at 800° C. to 1400° C. and grinding to an average particle size of about 300 mesh, the proportions of ferrous sulfate and alkali silicate being such that in the final product the weight of Fe₂O₃ is from 5% to 15% of the combined weight of Fe₂O₃ and SiO₂.

9. A process for forming an iron-silica ceramic pigment including the steps of forming a gel by reacting ferric ammonium sulphate with sulphuric acid and a soluble silicate in an aqueous medium and in proportions capable of yielding a composition of empirical formula Fe₂O₃·$x$SiO₂, where $x$ is of such value that the Fe₂O₃ is between 10 to 15% of the combined weights of Fe₂O₃ and SiO₂, and water in gel forming quantity, drying, washing and calcining at a temperature of 900° C. to 1050° C.

10. A process of forming a ceramic pigment comprising adding in an aqueous medium an alkali silicate to a water soluble, inorganic ferric salt and an acid having the same negative radical as said salt, in such proportions as to form a gel and to finish the reaction at a pH above the hydrolization point of the ferric salt, the amount of water being such that the weight of the reaction mixture is 15 to 16 times that of the combined Fe₂O₃ and SiO₂ content, allowing the mixture to stand until it "sets up" to a gel, drying the gel to the order of one tenth of its original volume, washing and calcining at from 800° C. to 1400° C., the proportions of ferric salt and alkali silicate being such that in the final product the weight of Fe₂O₃ is from 5% to 15% of the combined weight of Fe₂O₃ and SiO₂.

CARL J. HARBERT